US012597187B2

(12) United States Patent
Chathong et al.

(10) Patent No.: US 12,597,187 B2
(45) Date of Patent: Apr. 7, 2026

(54) SYSTEMS AND METHODS FOR GENERATING CONTENT CONTAINING AUTOMATICALLY SYNCHRONIZED VIDEO, AUDIO, AND TEXT

(71) Applicant: Musixmatch S.P.A., Bologna (IT)

(72) Inventors: Niche Chathong, Bologna (IT); Devid Farinelli, Bologna (IT); Daniele Sebastiano Giliberto, Bologna (IT); Pierfrancesco Melucci, Bologna (IT); Andrea Menegazzo, Bologna (IT)

(73) Assignee: Musixmatch S.P.A., Bologna (IT)

( * ) Notice: Subject to any disclaimer, the term of this patent is extended or adjusted under 35 U.S.C. 154(b) by 180 days.

(21) Appl. No.: 18/600,325

(22) Filed: Mar. 8, 2024

(65) Prior Publication Data

US 2024/0303888 A1      Sep. 12, 2024

Related U.S. Application Data

(60) Provisional application No. 63/489,584, filed on Mar. 10, 2023.

(51) Int. Cl.
G06F 3/0482 (2013.01)
G06F 3/04845 (2022.01)
(Continued)

(52) U.S. Cl.
CPC ............ G06T 11/60 (2013.01); G06F 3/0482 (2013.01); G06F 3/04845 (2013.01);
(Continued)

(58) Field of Classification Search
CPC ....... G06T 11/60; G06T 13/205; G06T 13/80; G06T 2200/24; G06F 40/279;
(Continued)

(56) References Cited

U.S. PATENT DOCUMENTS 8,209,623 B2 *   6/2012   Barletta ................ G06F 16/745
                                                                715/776
2002/0193895 A1 *  12/2002   Qian ...................... G11B 27/10
                                                                704/E21.02

(Continued)

OTHER PUBLICATIONS

Audio-Text Synchronization inside mp3 files (Year: 2004).*

*Primary Examiner* — Anil K Bhargava
(74) *Attorney, Agent, or Firm* — Dickinson Wright PLLC; Jonathan H. Harder

(57) ABSTRACT

In one embodiment, a computer-implemented method includes receiving a song file. The method includes extracting, using an artificial intelligence engine comprising one or more trained machine learning models, one or more audio features from the song file, and extracting, using the artificial intelligence engine comprising the one or more trained machine learning models, one or more text features from the song file. The method includes receiving a selection of a pre-built template to use to generate a customized content item, and generating, in real-time or near real-time, the customized content item based on the one or more audio features, the one or more text features, and the selection. The customized content item may be presented via a media player on a user interface.

20 Claims, 10 Drawing Sheets

(51) Int. Cl.

| | |
|---|---|
| *G06F 3/04847* | (2022.01) |
| *G06F 40/279* | (2020.01) |
| *G06F 40/30* | (2020.01) |
| *G06T 11/60* | (2006.01) |
| *G06T 13/20* | (2011.01) |
| *G06T 13/80* | (2011.01) |
| *G10H 1/00* | (2006.01) |

(52) U.S. Cl.
CPC ........ *G06F 3/04847* (2013.01); *G06F 40/279* (2020.01); *G06F 40/30* (2020.01); *G06T 13/205* (2013.01); *G06T 13/80* (2013.01); *G10H 1/0008* (2013.01); *G06T 2200/24* (2013.01); *G10H 2210/056* (2013.01)

(58) Field of Classification Search
CPC .... G06F 40/30; G06F 3/0482; G06F 3/04845; G06F 3/04847; G10H 1/0008; G10H 2210/056
See application file for complete search history.

(56) References Cited

U.S. PATENT DOCUMENTS

| | | | | |
|---|---|---|---|---|
| 2007/0168413 A1* | 7/2007 | Barletta | .............. | G06F 16/9577 |
| | | | | 707/E17.121 |
| 2014/0337374 A1* | 11/2014 | Glass | ................... | G06F 16/435 |
| | | | | 707/769 |
| 2019/0182552 A1* | 6/2019 | Johnsen | .............. | G06F 3/04883 |
| 2022/0210497 A1* | 6/2022 | Lyons | .................. | G06F 16/219 |

* cited by examiner

10

Cloud-Based Computing System
116

Server
128

Database
129

Training Engine
152

Machine Learning Model(s)
154

Network
20

Computing Device 12

User Interface
160

300

AT A PROCESSING DEVICE

PRESENT, IN A FIRST PORTION OF A USER INTERFACE, A LIST OF A SET OF PRE-BUILT TEMPLATES        302

RECEIVE THE SELECTION OF THE PRE-BUILT TEMPLATE FROM THE LIST OF THE SET OF PRE-BUILT TEMPLATES        304

306
PRESENT, IN A SECOND PORTION OF THE USER INTERFACE, THE CUSTOMIZED CONTENT ITEM IN THE MEDIA PLAYER

SYSTEMS AND METHODS FOR GENERATING CONTENT CONTAINING AUTOMATICALLY SYNCHRONIZED VIDEO, AUDIO, AND TEXT

CROSS-REFERENCES TO RELATED APPLICATIONS

This application claims priority to U.S. Application Patent Ser. No. 63/489,584 filed Mar. 10, 2023, titled "SYSTEMS AND METHODS FOR GENERATING CONTENT CONTAINING AUTOMATICALLY SYNCHRONIZED VIDEO, AUDIO, AND TEXT," the entire disclosure of which is hereby incorporated by reference for all purposes.

TECHNICAL FIELD

This disclosure relates to content. More specifically, this disclosure relates to systems and methods for generating content containing automatically synchronized video, audio, and text.

BACKGROUND

Content items (e.g., songs, movies, videos, podcasts, transcriptions, etc.) are conventionally played via a computing device, such as a smartphone, laptop, desktop, television, or the like. Creation of the content items for social media platforms and other platforms may be beneficial for the promotion of artists, to increase their fan base, to promote their latest releases or their upcoming concerts, etc. Oftentimes, the creation of promotional videos and/or content items may be performed by people who make the promotional videos and/or content items.

SUMMARY

In one embodiment, a computer-implemented method may include receiving a song file; extracting, using an artificial intelligence engine comprising one or more trained machine learning models, one or more audio features from the song file; extracting, using the artificial intelligence engine comprising the one or more trained machine learning models, one or more text features from the song file; receiving a selection of a pre-built template to use to generate a customized content item; and generating, in real-time or near real-time, the customized content item based on the one or more audio features, the one or more text features, and the selection, wherein the customized content item is presented via a media player on a user interface.

In one embodiment, a tangible, non-transitory computer-readable medium stores instructions that, when executed, cause a processing device to perform any operation of any method disclosed herein.

In one embodiment, a system includes a memory device storing instructions and a processing device communicatively coupled to the memory device. The processing device executes the instructions to perform any operation of any method disclosed herein.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which.

NOTATION AND NOMENCLATURE

Figure 1:
FIG. 1 illustrates a system architecture according to certain embodiments of this disclosure.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The terms "graph network" and "graph neural network" may be used interchangeably herein.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIGS. 1 through 10, discussed below, and the various embodiments used to describe the principles of this disclosure in this patent document are by way of illustration only and should not be construed in any way to limit the scope of the disclosure.

Content item (e.g., music, movies, shows, books, podcasts, video games, papers, websites, etc.) creation and/or generation may be a technically challenging problem.

To that end, the present disclosure provides a technical solution. For example, some embodiments may enable automatically extracting information from a media file (e.g., song file) and the content of the lyrics to produce an output tailored to each customized content item. Some embodiments may perform feature classification. The disclosed techniques may define 2 levels that relate the set of features used for this task. The 2 levels may specify 2 types of feature-sets that enable generating a customized content item. The 2 types of feature-sets may include dynamic and static feature-sets. Dynamic features may include the features that are suitable to conditioning dynamically some aspect of rendering within the same content item including video, audio, and/or text. The static features may include the features that identify the overall identity of the content item that is being created. The features may be derived, obtained, extracted, retrieved, etc. from 2 sources of information: audio and text.

Upon receiving a media file, the disclosed embodiments may extract audio features. For example, some embodiments may retrieve information about energy in a signal (RMS), predominant instruments information and the stems of the track (e.g., drums, bass, keyboards, vocals, other sounds, other instruments, etc.). Those features may be retrieved using DSP procedures (RMS) and STATA artificial intelligence driven solutions (e.g., instruments, stems). Furthermore, some embodiments may perform text-to-audio synchronization operations that may enable generating customized content items that include text, visual effects, graphics, etc. that change dynamically with the lyrics (e.g., mood, content, meaning, etc.).

Further, the disclosed embodiments may extract text features from the media file. The media file may be processed to identify a text file of lyrics of a song stored in the media file. The techniques may retrieve information about the overall semantic mood of the lyrics and keywords of the lyrics. Those features may be retrieved via SATA AI-driven solutions.

In addition, the disclosed techniques may enable a user to create customized content item by choosing from different levels of customizations through a web or app user interface. A set of pre-built templates may be provided in a portion of the user interface and a real-time preview may be provided in another portion of the user interface including a media player during customization. The tool may operate as a dynamic interface communicating with a backend to translate the user's choices into code to render the video. In some embodiments, features for each song may be pre-computed and used in both the render engine and customization guidance. The final customized content item may be rendered and downloaded after customization.

Turning now to the figures, FIG. 1 depicts a system architecture 10 according to some embodiments. The system architecture 10 may include one or more computing devices 12 of one or more users communicatively coupled to a cloud-based computing system 116. Each of the computing devices 12 and components included in the cloud-based computing system 116 may include one or more processing devices, memory devices, and/or network interface cards. The network interface cards may enable communication via a wireless protocol for transmitting data over short distances, such as Bluetooth, ZigBee, NFC, etc. Additionally, the network interface cards may enable communicating data over long distances, and in one example, the computing devices 12 and the cloud-based computing system 116 may communicate with a network 20. Network 20 may be a public network (e.g., connected to the Internet via wired (Ethernet) or wireless (WiFi)), a private network (e.g., a local area network (LAN) or wide area network (WAN)), or a combination thereof. Network 20 may also comprise a node or nodes on the Internet of Things (IoT).

The computing devices 12 may be any suitable computing device, such as a laptop, tablet, smartphone, or computer. The computing devices 12 may include a display capable of presenting a user interface 160 of an application. The application may be implemented in computer instructions stored on the one or more memory devices of the computing devices 12 and executable by the one or more processing devices of the computing device 12. The application may present various screens to a user. For example, the user interface 160 may present a screen that uses different portions to present a selection menu and a media player that plays an automatically generated customized content item in real-time or near real-time as the customized content item is rendered based on customization selections, template selections, and the like.

In some embodiments, the user interface 160 is executed by an application that is a stand-alone application installed and executing on the computing devices. In some embodiments, the application (e.g., website) executes within another application (e.g., web browser). The computing device 12 may also include instructions stored on the one or more memory devices that, when executed by the one or more processing devices of the computing devices 12 perform operations of any of the methods described herein.

In some embodiments, the cloud-based computing system 116 may include one or more servers 128 that form a distributed computing architecture. The servers 128 may be a rackmount server, a router computer, a personal computer, a portable digital assistant, a mobile phone, a laptop computer, a tablet computer, a camera, a video camera, a netbook, a desktop computer, a media center, any other device capable of functioning as a server, or any combination of the above. Each of the servers 128 may include one or more processing devices, memory devices, data storage, and/or network interface cards. The servers 128 may be in communication with one another via any suitable communication protocol. The servers 128 may execute an artificial intelligence (AI) engine that uses one or more machine learning models 154 to perform at least one of the embodiments disclosed herein. The cloud-based computing system 116 may also include a database 129 that stores data, knowledge, and data structures used to perform various embodiments. For example, the database 129 may store content items, time-synchronized text, tags and their association with the time-synchronized text, user profiles, customized content items, lyrics, audio, user profiles, etc. In some embodiments, the database 129 may be hosted on one or more of the servers 128.

In some embodiments the cloud-based computing system 116 may include a training engine 152 capable of generating the one or more machine learning models 154. The machine learning models 154 may be trained to receive a media file (e.g., song file) and to perform audio and/or text extraction and/or classification, among other things. The one or more machine learning models 154 may be generated by the training engine 152 and may be implemented in computer instructions executable by one or more processing devices of the training engine 152 and/or the servers 128. To generate the one or more machine learning models 154, the training engine 152 may train the one or more machine learning models 154.

The training engine 152 may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine 152 may be cloud-based, be a real-time software platform, include privacy software or protocols, and/or include security software or protocols.

To generate the one or more machine learning models 154, the training engine 152 may train the one or more machine learning models 154. The training engine 152 may use a base data set of audio, text, instrument audio signatures, stem audio signatures, semantic mood signatures, keywords, or some combination thereof.

The one or more machine learning models 154 may refer to model artifacts created by the training engine 152 using training data that includes training inputs and corresponding target outputs. The training engine 152 may find patterns in the training data wherein such patterns map the training input to the target output and generate the machine learning models 154 that capture these patterns. For example, the machine learning model may receive a song file and identify audio and/or text features to be used to customize a content item based on a select template. Although depicted separately from the server 128, in some embodiments, the training engine 152 may reside on server 128. Further, in some embodiments, the database 129, and/or the training engine 152 may reside on the computing devices 12.

As described in more detail below, the one or more machine learning models 154 may comprise, e.g., a single level of linear or non-linear operations (e.g., a support vector machine [SVM]) or the machine learning models 154 may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons.

Figure 2:
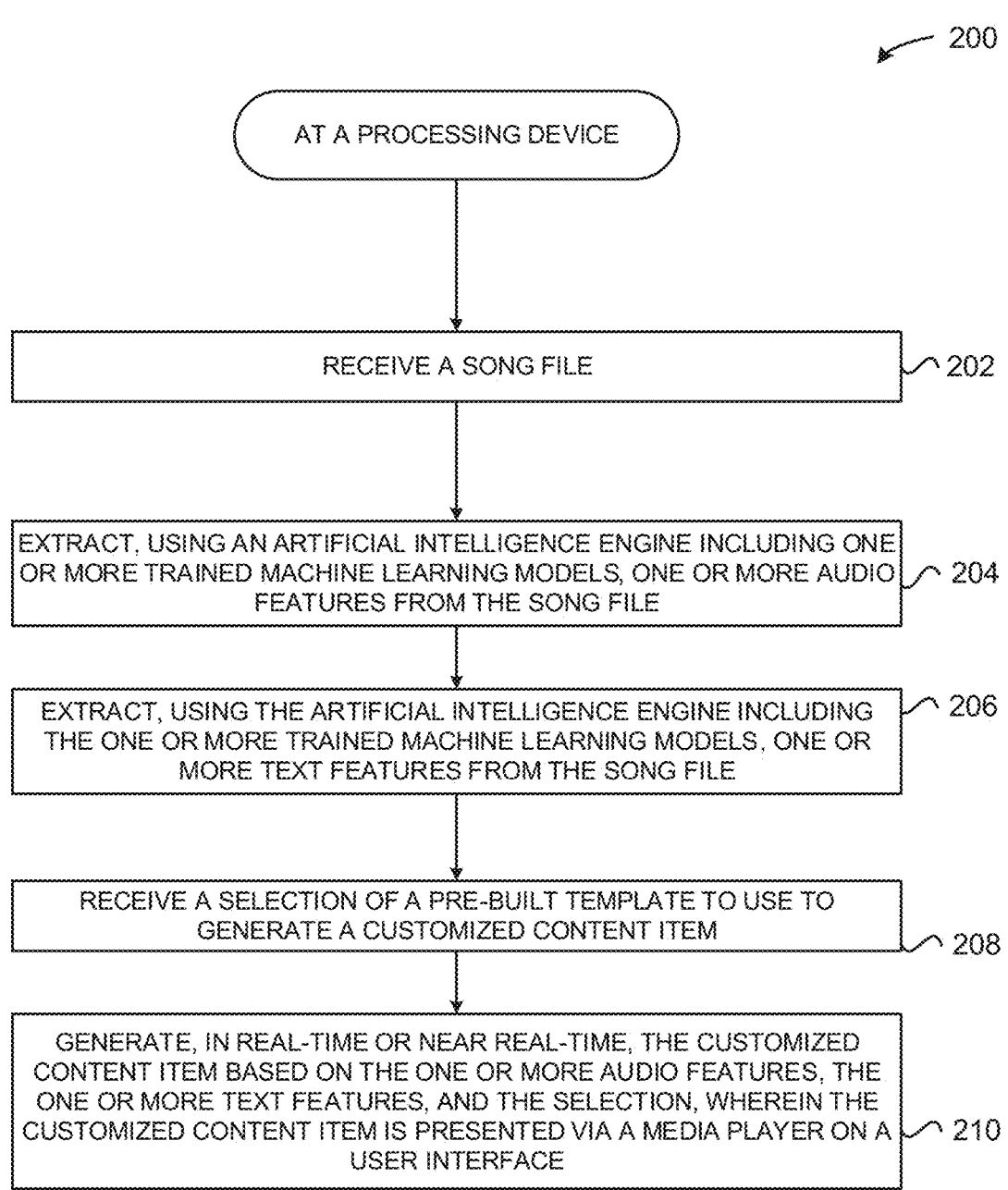
FIG. 2 illustrates an example of a method for generating a customized content item based on at least audio and text extracted from a song file according to certain embodiments of this disclosure.

FIG. 2 illustrates an example of a method 200 for generating a customized content item based on at least audio and text extracted from a song file according to certain embodiments of this disclosure. The method 200 may be performed by processing logic that may include hardware (circuitry, dedicated logic, etc.), software, or a combination of both. The method 200 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 200. The method 200 may be implemented as computer instructions stored on a memory device and executable by the one or more processors. In certain implementations, the method 200 may be performed by a single processing thread. Alternatively, the method 200 may be performed by two or more processing threads, each thread implementing one or more individual functions, routines, subroutines, or operations of the methods.

At block 202, the processing device may receive a media file (e.g., song file).

At block 204, the processing device may extract, using an artificial intelligence engine including one or more trained machine learning models, one or more audio features from the media file. In some embodiments, the processing device may extract at least two levels of the one or more audio features. The at least two levels may pertain to dynamic features suitable for dynamically configuring at least one aspect of rendering the customized content item and may pertain to static features that specify an identity of the customized content item.

Further, extracting the one or more audio features from the song file may further include identifying one or more predominant instruments used at one or more sections of a song stored in the song file. Each of the one or more sections may pertain to a structure of the song (e.g., chorus, verse, stanza, etc.).

Further, extracting the one or more audio features from the song file may further include separating one or more stems using the song file, wherein the one or more stems are stored in one or more files pertaining to a bass, a drum, a keyboard, another instrument, or some combination thereof. The processing device may process the one or more files storing the one or more stems to extract dynamic features related to a behavior of an audio signal, and the processing device may process the one or more features related to the behavior to cause one or more graphical elements in the customized content item to move.

At block 206, the processing device may extract, using the artificial intelligence engine including the one or more trained machine learning models, one or more text features from the media file. In some embodiments, extracting the one or more text features from the song file may further include obtaining a text file from the song file, wherein the text file comprises lyrics. The processing device may identify one or more moods of the lyrics, and may identify one or more keywords included in the lyrics.

In some embodiments, extracting the one or more text features from the media file may include extracting, using a natural language processing technique, one or more keywords from each line of lyrics included in the song file, determining, based on the one or more keywords, an overall meaning of a song stored in the song file, and generating, in real-time or near real-time, the customized content item based on the overall meaning.

At block 208, the processing device may receive a selection of a pre-built template to use to generate a customized content item.

At block 210, the processing device may generate, in real-time or near real-time, the customized content item based on the one or more audio features, the one or more text features, and the selection. In some embodiments, the customized content item may be presented via a media player on a user interface of the computing device 12. In some embodiments, the customized content item may be downloaded to a computing device. The customized content item may include video, audio, text, images, etc.

In some embodiments, the processing device may synchronize text associated with the song file with audio associated with the song file at a character by character level, wherein each character of words is related to a precise timestamp in a song stored in the song file. In some embodiments, the processing device may synchronize text associated with the song file with audio associated with the song file at a word by word level, wherein each word of lyrics is related to a precise timestamp in the song. In some embodiments, the processing device may synchronize text associated with the song file with audio associated with the song file at a line by line level, wherein each line of the lyrics is related to a precise timestamp in the song.

In some embodiments, the processing device ay predict, using a mood classification model of the one or more trained machine learning models, one or more moods of a song stored in the song file. The processing device may generate, in real-time or near real-time, the customized content item based on the one or more moods.

In some embodiments, the processing device may match a song stored in the song file with a pre-built graphic template. The matching may be performed by using a cosine-similarity between semantic embeddings retried from sentiment analysis performed on lyrics and content analysis performed on audio of the song file.

Figure 3:
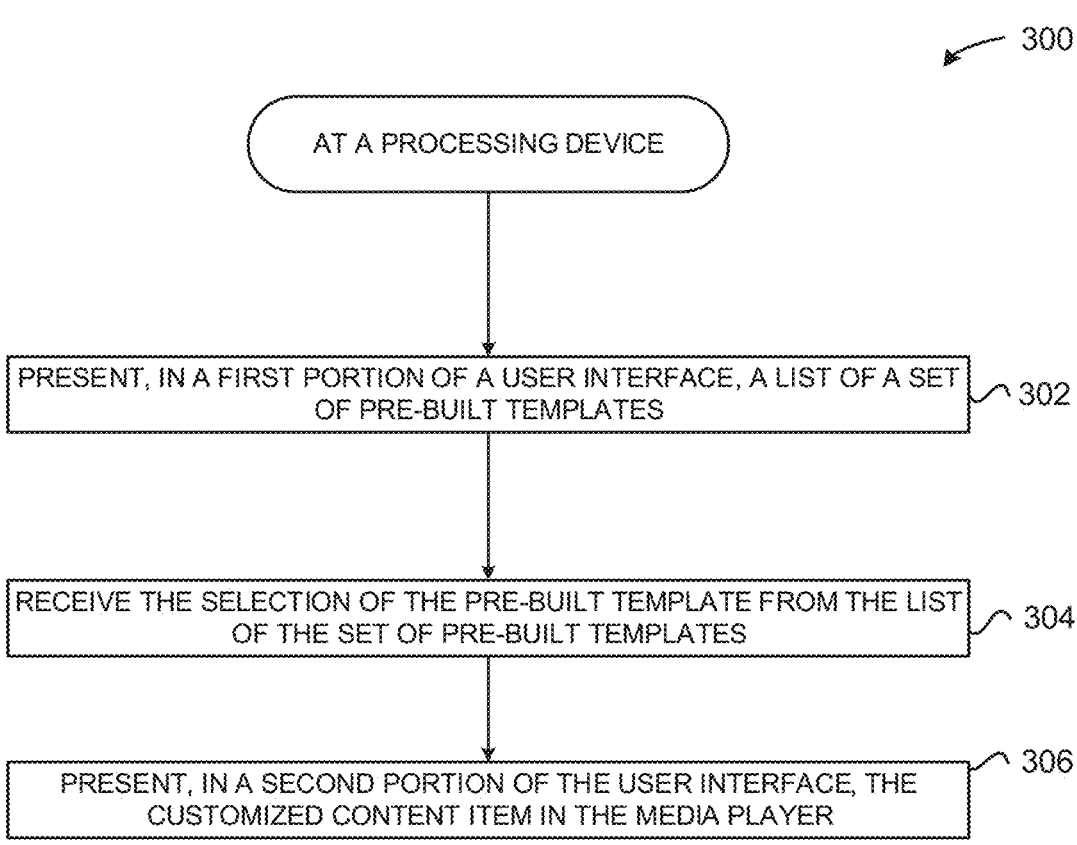
FIG. 3 illustrates an of a method for presenting templates and customized content items in different portions of a user interface according to certain embodiments of this disclosure.

FIG. 3 illustrates an of a method 300 for presenting templates and customized content items in different portions of a user interface according to certain embodiments of this disclosure. The method 300 may be performed by processing logic that may include hardware (circuitry, dedicated logic, etc.), software, or a combination of both. The method 300 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 300. The method 300 may be implemented as computer instructions stored on a memory device and executable by the one or more processors. In certain implementations, the method 300 may be performed by a single processing thread. Alternatively, the method 300 may be performed by two or more processing threads, each thread implementing one or more individual functions, routines, subroutines, or operations of the methods.

At block 302, the processing device may present, in a first portion of a user interface, a list of pre-built templates.

At block 304, the processing device may receive the selection of the pre-built template from the list of the set of pre-built templates.

At block 306, the processing device may present, in a second portion of the user interface, the customized content item in the media player. In some embodiments, the first portion including the list and the second portion including the media player may be presented concurrently in the user interface such that the user may select a different template and the media player may dynamically update the customized content item being player with the new template in real-time or near real-time while the customized content item is playing. Further, the first portion of the user interface may present customization menu that enables the user to select one or more customizations to modify the customized content item.

In some embodiments, the processing device may present a customization user interface on the user interface. The processing device may receive one or more customizations to the customized content item, the processing device may render, in real-time or near real-time, a subsequent customized content item that implements the one or more customizations. The one or more customizations may pertain to an aspect ratio, time-synchronization of lyrics, a background image, a video background, background treatment, font styling, font alignment, font size, font type, a visual effect based on music rhythm, graphical element placement, blurring, a color scheme, a start time to a song, an end time to a song, a song structure, or some combination thereof.

Figure 4:
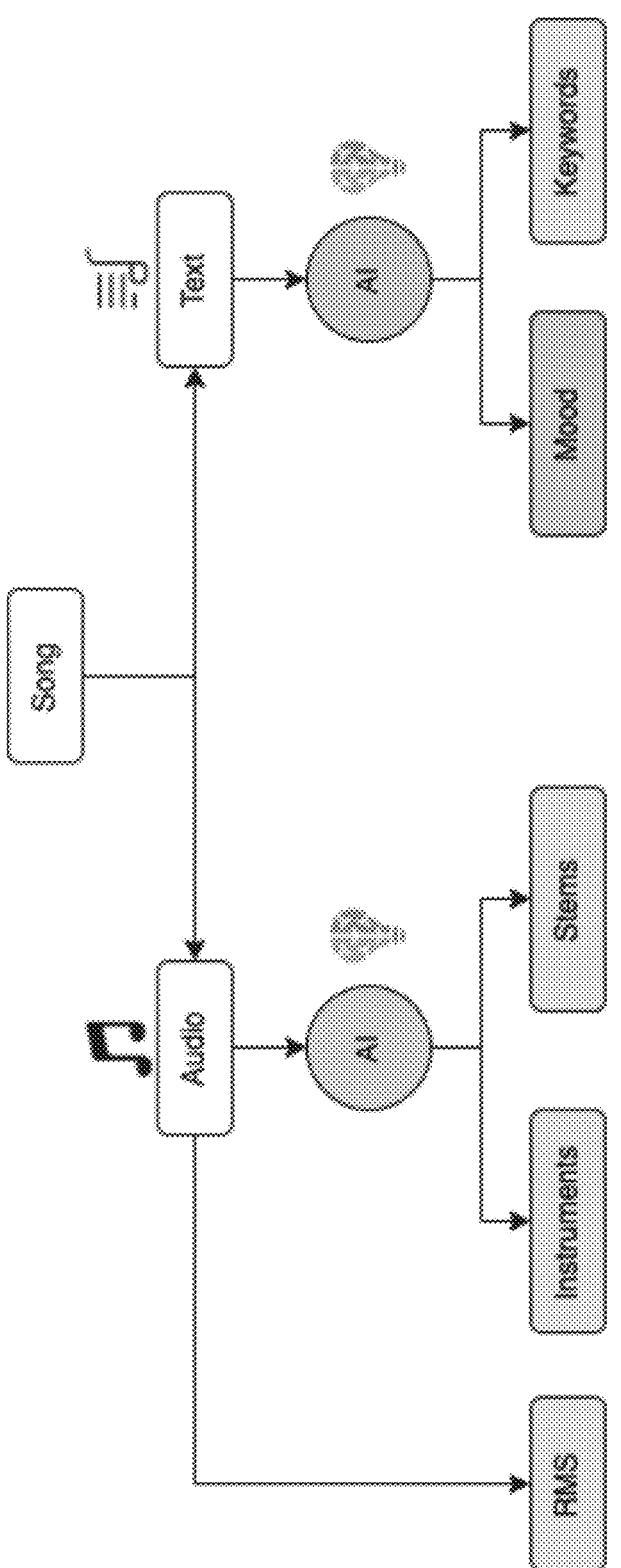
FIG. 4 illustrates an example feature extraction and classification workflow according to certain embodiments of this disclosure.

FIG. 4 illustrates an example feature extraction and classification workflow according to certain embodiments of this disclosure. As depicted, a song file may be uploaded to the cloud-based computing system 116. The song file may be separated into an audio file and a text file. The text file may be processed using one more machine learning models 154 of an artificial intelligence engine. The machine learning models 154 may classify one or more moods of one or more sections of the song based on the text. The machine learning models 154 may extract one or more keywords from the text using natural language processing. The machine learning models 154 may identify some of the words as more important than others based on their occurrence, nearness to other important words, placement in lyrics, etc.

The instruments, stems and keywords may be referred to as dynamic features. Dynamic features are the features that are suitable to condition dynamically some aspect of rendering within the same video. The mood may be referred to as static features that identify the overall identity of the video being generated.

In some embodiments, the audio may be processed by the machine learning models 154 of the artificial intelligence engine to identify predominant instruments in each section of a song and stems. Further, the audio may be processed to identify the root mean square (RMS) levels of the audio.

The output of the workflow depicted in FIG. 4 may include a JavaScript Object Notation (JSON) file containing the set of information extracted.

Figure 5:
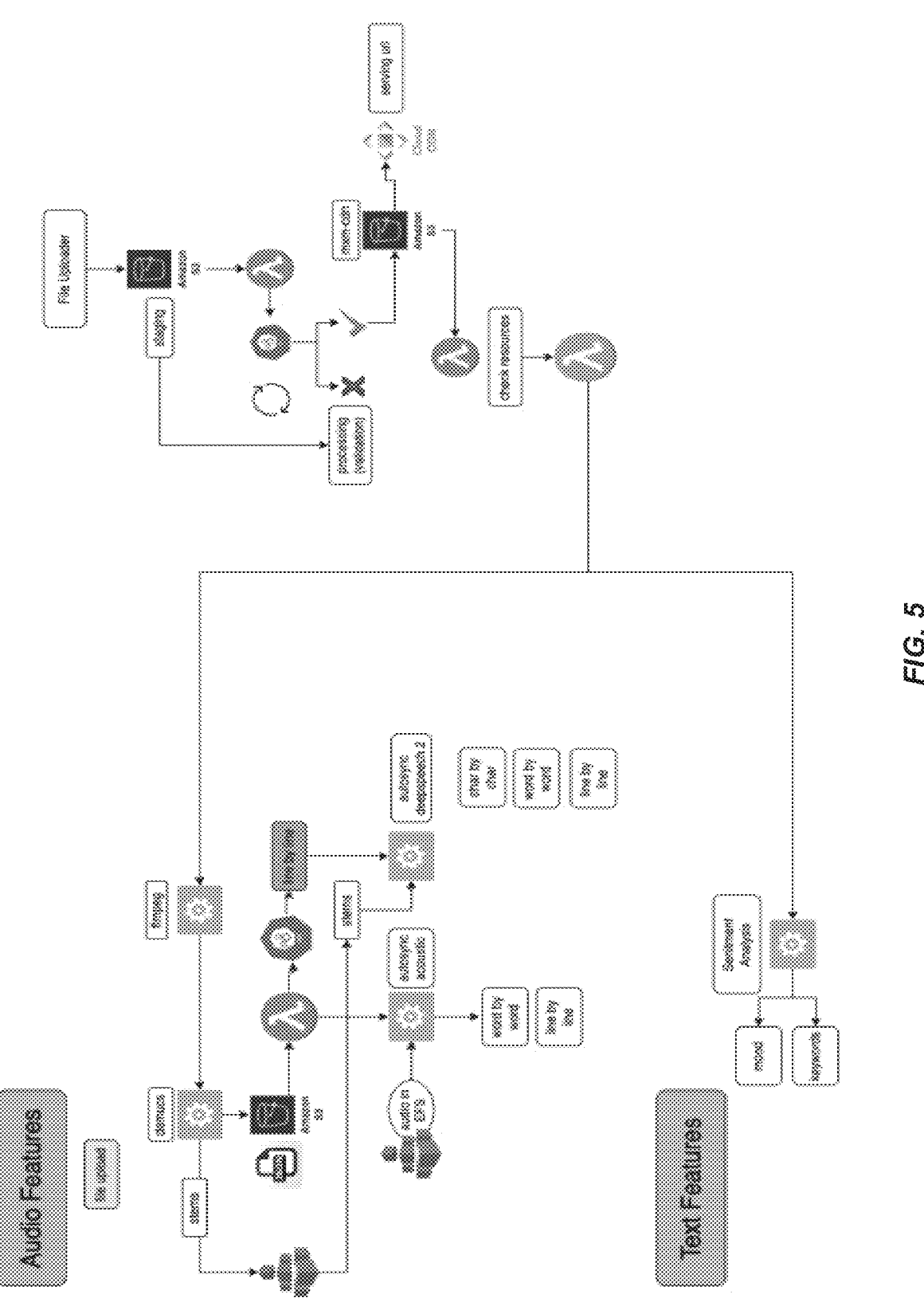
FIG. 5 illustrates an example audio and text features pipeline according to certain embodiments of this disclosure.

FIG. 5 illustrates an example audio and text features pipeline according to certain embodiments of this disclosure. The audio analysis may include a pipeline triggered by the upload of a media file (e.g., song file such as mp3) under certain conditions (e.g., also lyrics should be provided). Such an event may trigger a workflow of operations that provides a desired set of features and synchronization operations for the provided song in the media file. The same trigger may start the text feature extraction workflow. The result of both operations may define the entire set of information used to generate a customized content item based on mood, instruments, stems, keywords, meaning, and the like.

Audio feature extraction may include instrument recognition in the song stored in the song file. The instrument recognition may predict the predominant instrument (e.g., class) among a set of instruments (e.g., classes) for a given excerpt of audio. For example, a suitable set of instruments (classes) may be defined for a desired scope. A deep learning architecture of a neural network may be used to classify for the classes of interest in the desired scope to predict the predominant instrument for a given audio portion of a song. The audio portion may vary in length, since they are related to track-structure segmentation (e.g., stanza, chorus, verse, etc.). Accordingly, in some embodiments a predominant instrument may be classified for each part of the song (e.g., chorus, verse, bridge, etc.). In some embodiments, a prediction of predominant instrument for the overall song may be provided to use as a static feature. In some embodiments, a MusiCNN architecture including convolutional neural networks that perform music tagging may be used. Several tests may be used to define custom post-processing strategy and class-filtering to tailor the architecture to specific implementation.

In some embodiments, stems may be separated from the audio. For example, stems may refer to the single tracks that are combined to compose the full mixture of audio of the song. In some embodiments, separating the stems may result in four different audio file per song (e.g., the bass, drums, the keyboard, and other instruments). Those tracks may be further processed to extract dynamic features related to the behavior of the audio signal, e.g., RMS, onset detection, etc. The dynamic features may be used to generate the customized content item by triggering certain graphic element movements in such a manner that provides sensation of certain graphic elements to "react" to the music.

In addition, during the audio feature extraction workflow, in some embodiments, synchronization operation(s) may be performed. For example, synchronization operations may be performed to synchronize the text with the audio at least three different levels of granularity (i) character-by-character: each character of words is related to a precise timestamp in the song, (ii) word-by-word: each word of the lyrics is related to a precise timestamp in the song, (iii) line-by-line: each line of the lyrics (derived from the line division of the lyrics) is related to a precise timestamp of the song. One or more of those levels of granularity may be used to generate the customized content item.

Text feature extraction may include extracting one or more keywords. For example, text features may be extracted from the lyrics of the song. This process may use one or more natural language processing techniques. To retrieve keywords that are related to the overall meaning of the song (e.g., based on number of occurrence, semantic meaning, definition, etc.). In some embodiments, an n-gram compose the full keywords, which refers to containing more of one word, and it is retrieved for each line of the lyrics. A posteriori technique that uses cosine similarity may be used to weight the keywords for each line with regard to the overall lyrics to filter out some keywords that are less relevant than other keywords.

In some embodiments, one or more moods of one or more portions of the song may be determined. For example, a mood classification machine learning model may be trained and used to process both the audio file and the text data related to the lyrics to predict a mood for a given song. The moods may include peaceful, tender, sentimental, melancholy, somber, easy going, romantic, sophisticated, cool, gritty, upbeat, empowering, sensual, yearning, serious, lively, stirring, fiery, urgent, brooding, excited, rowdy, energizing, defiant, aggressive, and the like.

In some embodiments, one or more trained machine learning models of the artificial intelligence engine may link the sentiment analysis performed on the lyrics and content analysis performed on the audio to a set of pre-built graphic templates which have been labeled. The matching may be performed using cosine-similarity between semantic embeddings retrieved for the analysis and for the labeled templates. For example, a template with color palette of reds and hearts as graphic elements may be labeled as a "love" template. If the principal theme or mood for the lyrics is related with the semantic concept of love, this template may be selected by the mood classification machine learning model.

In some embodiments, after processing the information (e.g., audio and text) that is extracted, the techniques may include create a unique template tailored one or more customizations made by the user. As described further herein, a portion of the user interface may provide customization options in a menu.

A user experience entry point may prompt the user to specify a resource (e.g., a song to use for the customized content item) and at least a visual-style choice through a set of pre-built templates. After receiving the song file and the selected template, the customized content item may be generated automatically. The user may further customize the customized content item by making one or more additional customizations in real-time or near real-time, which are rendered dynamically in a media player on the user interface. That is, while the customization process is ongoing, a real-time preview may be constantly or continuously provided via a media player to guide the user in customizing the output.

In some embodiments, Remotion may be used to dynamically render the customized content item. Remotion may translate the customization choices made by the user into code that renders the customized content item (e.g., video). The set of extracted features is saved to the database 129. Each time the song is selected, the features are retrieved from the database 129. The set of features may be used in both the render engine (e.g., the synchronization between audio and text is used to display words as they are sung in the song) and in the guidance of customization for the user, such as highlighting some templates rather than others, to match those that are more suitable for the song's mood, or for the sentiment of the lyrics (all of those criterions of similarity/matching for the templates are human-curated and selected by the design team of the company). Once the customized content item is generated, the customized content item is rendered and stored via a server of the cloud-based computing system 116 and may be downloaded by one or more computing devices.

Figure 6:
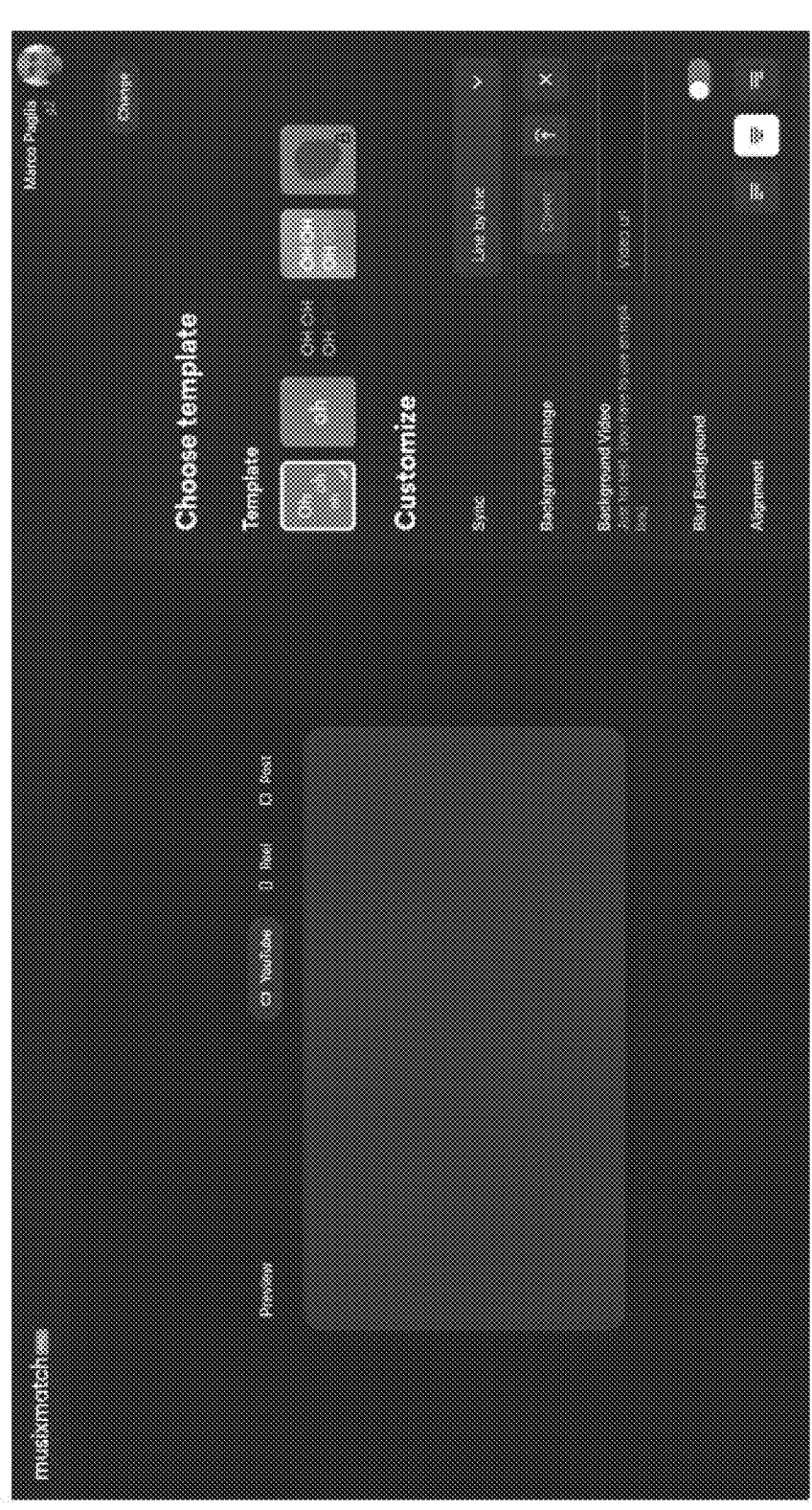
FIG. 6 illustrates an example user interface presenting different portions including a media player and templates according to certain embodiments of this disclosure.

FIG. 6 illustrates an example user interface presenting different portions including a media player and templates according to certain embodiments of this disclosure. The media player may present the customized content item in real-time in one portion of the user interface while the customization choices are concurrently selected in another portion of the user interface.

Figure 7:
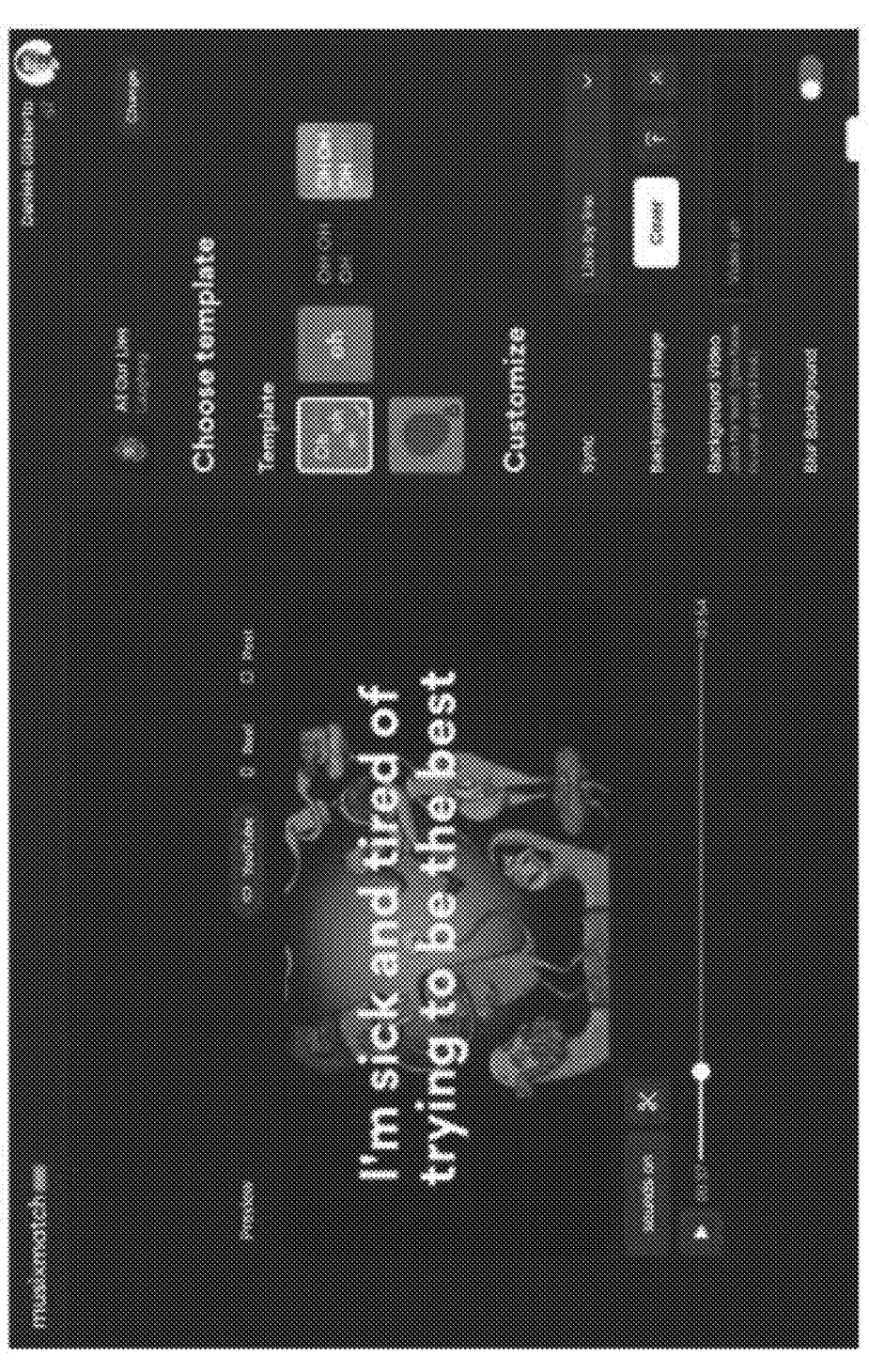
FIG. 7 illustrates an example an example rendered customized content item played via a media player in a portion of a user interface and templates available for selection in another portion of the user interface according to certain embodiments of this disclosure.

FIG. 7 illustrates an example an example rendered customized content item played via a media player in a portion of a user interface and templates available for selection in another portion of the user interface according to certain embodiments of this disclosure.

Figure 8:
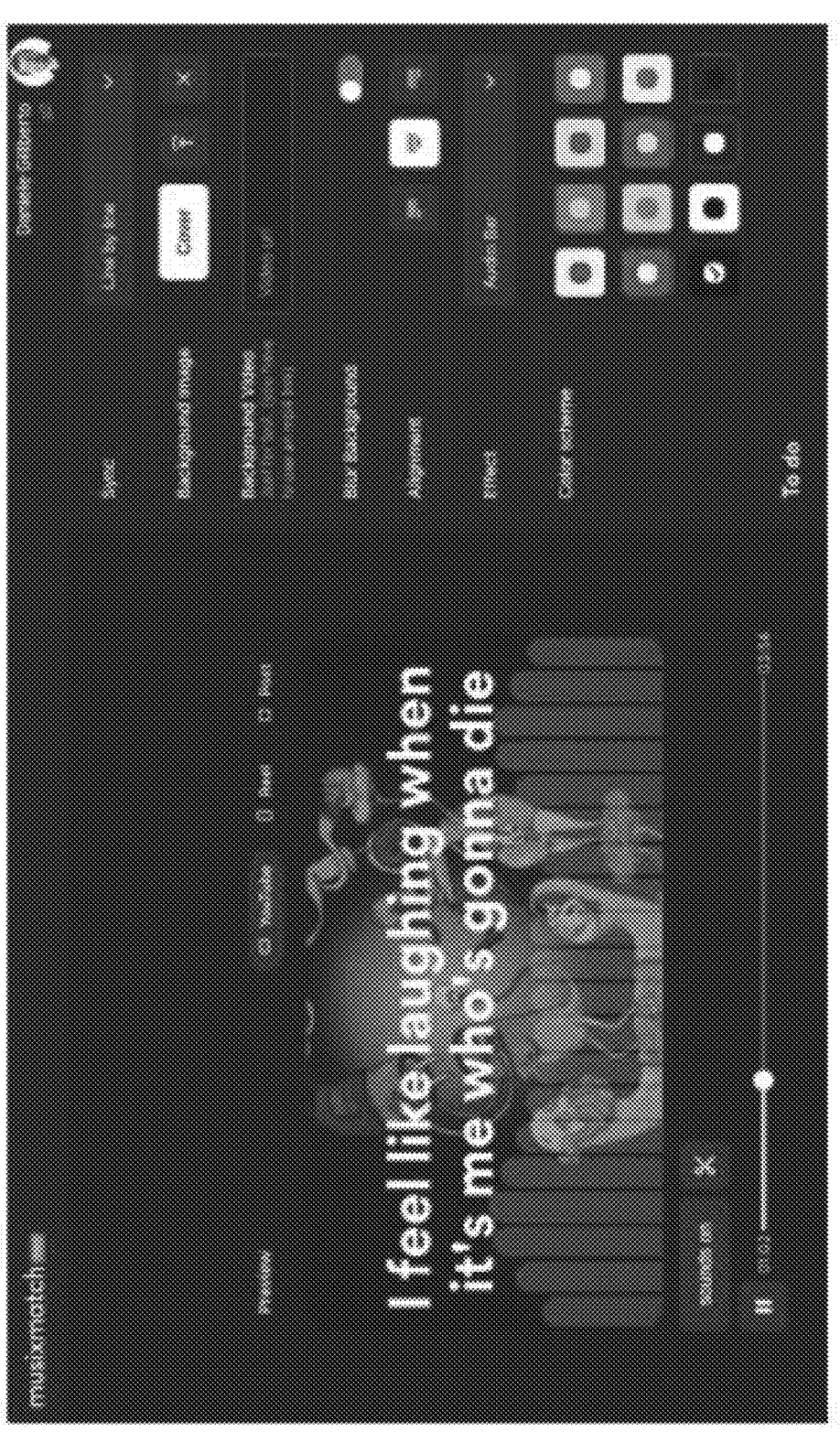
FIG. 8 illustrates an example of customizing a selected template in real-time or near real-time according to certain embodiments of this disclosure.

FIG. 8 illustrates an example of customizing a selected template in real-time or near real-time according to certain embodiments of this disclosure. The customization options may include defining the aspect ratio of the output (e.g., landscape for YouTube, Reel for social media, squared for media posts, etc.). The customization may include selecting a predefined template.

Selecting the template may enable customizing each template with options such as time-synchronization of the lyrics by line, by word, by letter, by group of sentences, etc. Further, the user may select a background image for an album cover or custom upload. The user may select a video background by directing to a video URL or uploading a video. The user may customize background treatment, such as blurring. The user may customize font style, alignment (right, left, center), font size, font type, etc. The user may add visual effects based on the music rhythm, e.g., moving elements, visual effects on the background image/video, such as changing saturation, light blurriness. The user may change the color scheme of the video, use suggested palette, etc. The user may determine the section of the song that should be turned into a video by selecting the start/end time, selecting the part of the song structure (e.g., chorus, verse, bridge, etc.).

Figure 9:
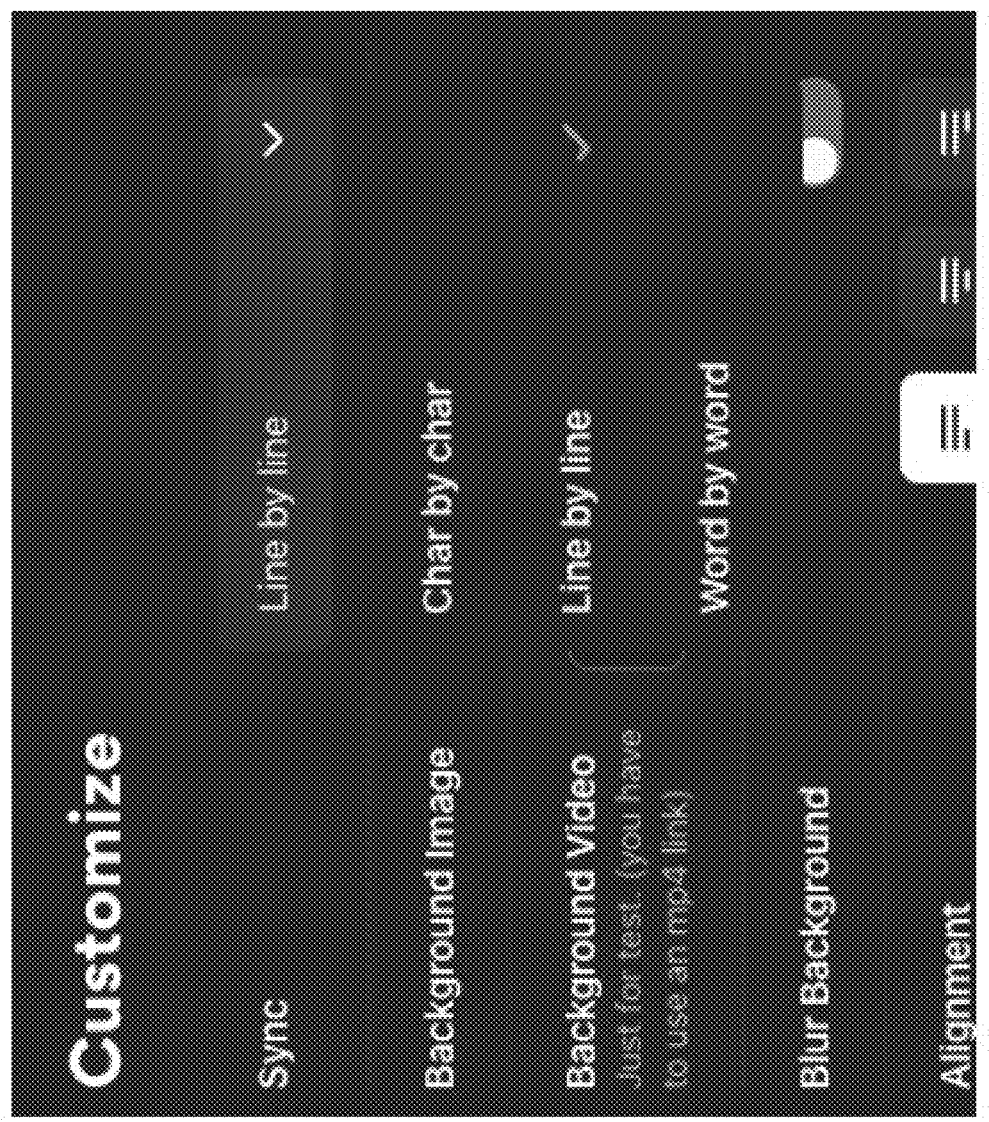
FIG. 9 illustrates an example of synchronization customization options according to certain embodiments of this disclosure.

FIG. 9 illustrates an example of synchronization customization options according to certain embodiments of this disclosure.

Figure 10:
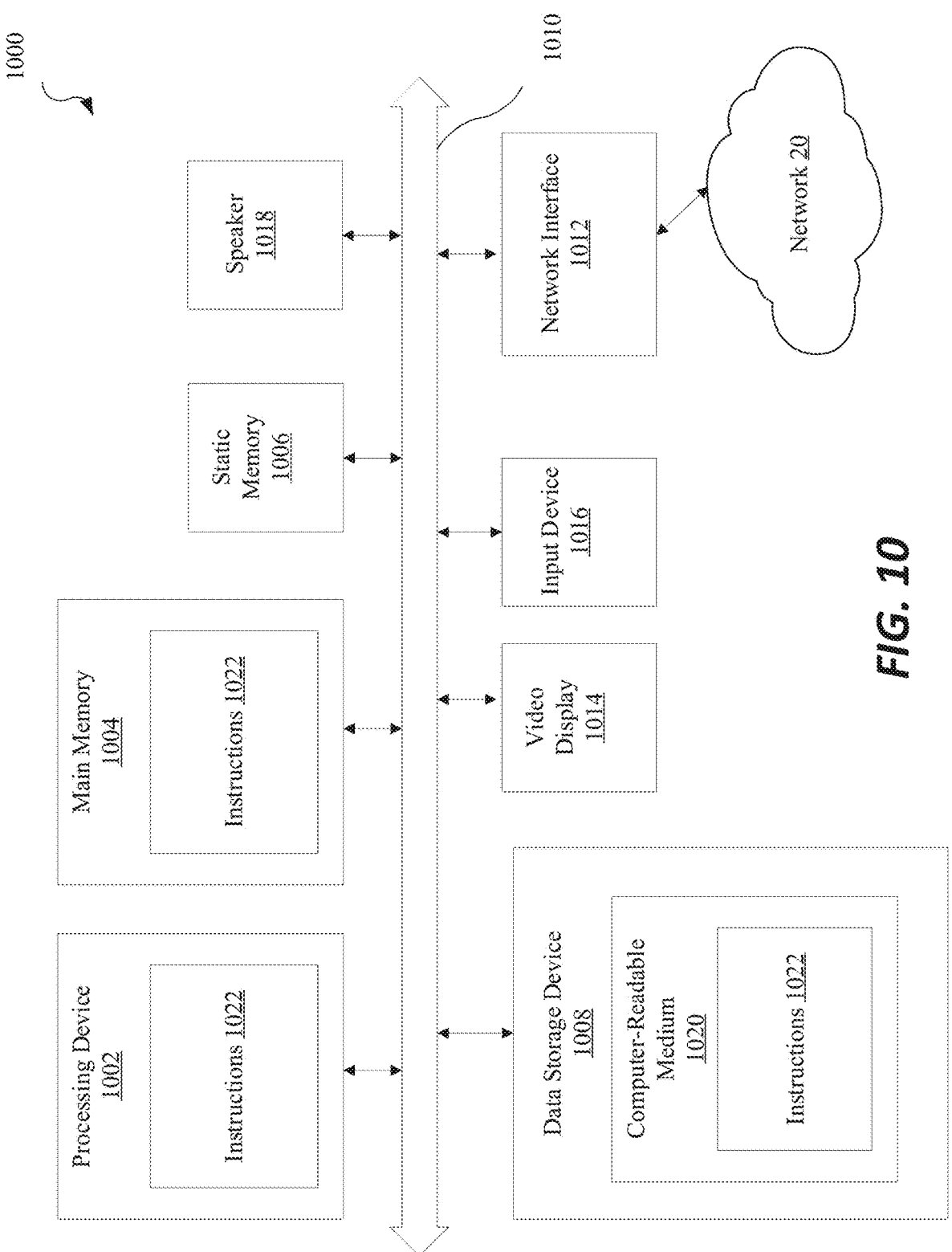
FIG. 10 illustrates an example computer system according to embodiments of this disclosure.

FIG. 10 illustrates an example computer system 1000, which can perform any one or more of the methods described herein. In one example, computer system 1000 may include one or more components that correspond to the computing device 12, one or more servers 128 of the cloud-based computing system 116, or one or more training engines 152 of the cloud-based computing system 116 of FIG. 1. The computer system 1000 may be connected (e.g., networked) to other computer systems in a LAN, an intranet, an extranet, or the Internet. The computer system 1000 may operate in the capacity of a server in a client-server network environment. The computer system 1000 may be a personal computer (PC), a tablet computer, a laptop, a wearable (e.g., wristband), a set-top box (STB), a personal Digital Assistant (PDA), a smartphone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 1000 includes a processing device 1002, a main memory 1004 (e.g., read-only memory (ROM), solid state drive (SSD), flash memory, dynamic random access memory (DRAM) such as synchronous DRAM (SDRAM)), a static memory 1006 (e.g., solid state drive (SSD), flash memory, static random access memory (SRAM)), and a data storage device 1008, which communicate with each other via a bus 1010.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions for performing any of the operations and steps of any of the methods discussed herein.

The computer system 1000 may further include a network interface device 1012. The computer system 1000 also may include a video display 1014 (e.g., a liquid crystal display (LCD) or a cathode ray tube (CRT)), one or more input devices 1016 (e.g., a keyboard and/or a mouse), and one or more speakers 1018 (e.g., a speaker). In one illustrative example, the video display 1014 and the input device(s) 1016 may be combined into a single component or device (e.g., an LCD touch screen).

The data storage device 1016 may include a computer-readable medium 1020 on which the instructions 1022 embodying any one or more of the methodologies or functions described herein are stored. The instructions 1022 may also reside, completely or at least partially, within the main memory 1004 and/or within the processing device 1002 during execution thereof by the computer system 1000. As such, the main memory 1004 and the processing device 1002 also constitute computer-readable media. The instructions 1022 may further be transmitted or received over a network 20 via the network interface device 1012.

While the computer-readable storage medium 1020 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

Clauses

1. A computer-implemented method comprising:
receiving a song file;
extracting, using an artificial intelligence engine comprising one or more trained machine learning models, one or more audio features from the song file;
extracting, using the artificial intelligence engine comprising the one or more trained machine learning models, one or more text features from the song file;
receiving a selection of a pre-built template to use to generate a customized content item; and
generating, in real-time or near real-time, the customized content item based on the one or more audio features, the one or more text features, and the selection, wherein the customized content item is presented via a media player on a user interface.

2. The computer-implemented method of any clause herein, further comprising:
extracting at least two levels of the one or more audio features, wherein the at least two levels pertain to dynamic features suitable for dynamically configuring at least one aspect of rendering the customized content item and to static features that specify an identity of the customized content item.

3. The computer-implemented method of any clause herein, wherein extracting the one or more text features from the song file further comprises:
obtaining a text file from the song file, wherein the text file comprises lyrics;
identifying one or more moods of the lyrics;
identifying one or more keywords included in the lyrics;

4. The computer-implemented method of any clause herein, further comprising:
presenting, in a first portion of the user interface, a list of a plurality of pre-built templates;
receiving the selection of the pre-built template from the list of the plurality of pre-built templates; and
presenting, in a second portion of the user interface, the customized content item in the media player.

5. The computer-implemented method of any clause herein, further comprising downloading the customized content item to a computing device.

6. The computer-implemented method of any clause herein, wherein extracting, using the artificial intelligence engine comprising the one or more trained machine learning models, the one or more audio features from the song file further comprises:
identifying one or more predominant instruments used at one or more sections of a song stored in the song file, wherein each of the one or more sections pertain to a structure of the song.

7. The computer-implemented method of any clause herein, wherein extracting, using the artificial intelligence engine comprising the one or more trained machine learning models, the one or more audio features from the song file further comprises:
separating one or more stems using the song file, wherein the one or more stems are stored in one or more files pertaining to a bass, a drum, a keyboard, another instrument, or some combination thereof;
processing the one or more files storing the one or more stems to extract dynamic features related to a behavior of an audio signal; and
processing the one or more features related to the behavior to cause one or more graphical elements in the customized content item to move.

8. The computer-implemented method of any clause herein, further comprising:
synchronizing text associated with the song file with audio associated with the song file at a character by character level, wherein each character of words is related to a precise timestamp in a song stored in the song file;
synchronizing text associated with the song file with audio associated with the song file at a word by word level, wherein each word of lyrics is related to a precise timestamp in the song; and
synchronizing text associated with the song file with audio associated with the song file at a line by line level, wherein each line of the lyrics is related to a precise timestamp in the song.

9. The computer-implemented method of any clause herein, wherein extracting, using the artificial intelligence engine comprising the one or more trained machine learning models, the one or more text features from the song file further comprises:
extracting, using a natural language processing technique, one or more keywords from each line of lyrics included in the song file;
determining, based on the one or more keywords, an overall meaning of a song stored in the song file; and
generating, in real-time or near real-time, the customized content item based on the overall meaning.

10. The computer-implemented method of any clause herein, further comprising:
predicting, using a mood classification model of the one or more trained machine learning models, one or more moods of a song stored in the song file; and generating, in real-time or near real-time, the customized content item based on the one or more moods.

11. The computer-implemented method of any clause herein, further comprising matching a song stored in the song file with a pre-built graphic template, wherein the matching is performed by using cosine-similarity between semantic embeddings retrieved from sentiment analysis performed on lyrics and content analysis performed on audio of the song file.

12. The computer-implemented method of any clause herein, further comprising:

presenting a customization user interface on the user interface;

receiving one or more customizations to the customized content item; and rendering, in real-time or near real-time, a subsequent customized content item that implements the one or more customizations, wherein the one or more customizations pertain to an aspect ratio, time-synchronization of lyrics, a background image, a video background, background treatment, font styling, font alignment, font size, font type, a visual effect based on music rhythm, graphical element placement, blurring, a color scheme, a start time to a song, an end time to a song, a song structure, or some combination thereof.

13. A system comprising:

a memory device storing instructions; and a processing device communicatively coupled to the memory device, wherein the processing device executes the instructions to:

receive a song file;

extract, using an artificial intelligence engine comprising one or more trained machine learning models, one or more audio features from the song file;

extract, using the artificial intelligence engine comprising the one or more trained machine learning models, one or more text features from the song file;

receive a selection of a pre-built template to use to generate a customized content item; and generate, in real-time or near real-time, the customized content item based on the one or more audio features, the one or more text features, and the selection, wherein the customized content item is presented via a media player on a user interface.

14. The system of any clause herein, wherein the processing device:

extracts at least two levels of the one or more audio features, wherein the at least two levels pertain to dynamic features suitable for dynamically configuring at least one aspect of rendering the customized content item and to static features that specify an identity of the customized content item.

15. The system of any clause herein, wherein extracting the one or more text features from the song file further comprises:

obtaining a text file from the song file, wherein the text file comprises lyrics;

identifying one or more moods of the lyrics;

identifying one or more keywords included in the lyrics;

16. The system of any clause herein, wherein the processing device:

presents, in a first portion of the user interface, a list of a plurality of pre-built templates;

receives the selection of the pre-built template from the list of the plurality of pre-built templates; and presents, in a second portion of the user interface, the customized content item in the media player.

17. The system of any clause herein, further comprising downloading the customized content item to a computing device.

18. The system of any clause herein, wherein extracting, using the artificial intelligence engine comprising the one or more trained machine learning models, the one or more audio features from the song file further comprises:

identifying one or more predominant instruments used at one or more sections of a song stored in the song file, wherein each of the one or more sections pertain to a structure of the song.

19. The system of any clause herein, wherein extracting, using the artificial intelligence engine comprising the one or more trained machine learning models, the one or more audio features from the song file further comprises:

separating one or more stems using the song file, wherein the one or more stems are stored in one or more files pertaining to a bass, a drum, a keyboard, another instrument, or some combination thereof;

processing the one or more files storing the one or more stems to extract dynamic features related to a behavior of an audio signal; and processing the one or more features related to the behavior to cause one or more graphical elements in the customized content item to move.

20. A tangible, non-transitory computer readable medium storing instructions that, when executed, cause a processing device to:

receive a song file;

extract, using an artificial intelligence engine comprising one or more trained machine learning models, one or more audio features from the song file;

extract, using the artificial intelligence engine comprising the one or more trained machine learning models, one or more text features from the song file;

receive a selection of a pre-built template to use to generate a customized content item; and generate, in real-time or near real-time, the customized content item based on the one or more audio features, the one or more text features, and the selection, wherein the customized content item is presented via a media player on a user interface.

The invention claimed is:

1. A computer-implemented method comprising:

receiving a song file;

extracting, using an artificial intelligence engine comprising one or more trained machine learning models, one or more audio features from the song file;

extracting, using the artificial intelligence engine comprising the one or more trained machine learning models, one or more text features from the song file;

receiving a selection of a pre-built template to use to generate a customized content item; and generating the customized content item based on the one or more audio features, the one or more text features, and the selection, wherein the customized content item is presented via a media player on a user interface.

2. The computer-implemented method of claim 1, further comprising:

extracting at least two levels of the one or more audio features, wherein the at least two levels pertain to dynamic features suitable for dynamically configuring at least one aspect of rendering the customized content item and to static features that specify an identity of the customized content item.

3. The computer-implemented method of claim 1, wherein extracting the one or more text features from the song file further comprises:

obtaining a text file from the song file, wherein the text file comprises lyrics;

identifying one or more moods of the lyrics;

identifying one or more keywords included in the lyrics.

4. The computer-implemented method of claim 1, further comprising:

presenting, in a first portion of the user interface, a list of a plurality of pre-built templates;

receiving the selection of the pre-built template from the list of the plurality of pre-built templates; and presenting, in a second portion of the user interface, the customized content item in the media player.

5. The computer-implemented method of claim 1, further comprising downloading the customized content item to a computing device.

6. The computer-implemented method of claim 1, wherein extracting, using the artificial intelligence engine comprising the one or more trained machine learning models, the one or more audio features from the song file further comprises:

identifying one or more predominant instruments used at one or more sections of a song stored in the song file, wherein each of the one or more sections pertain to a structure of the song.

7. The computer-implemented method of claim 1, wherein extracting, using the artificial intelligence engine comprising the one or more trained machine learning models, the one or more audio features from the song file further comprises:

separating one or more stems using the song file, wherein the one or more stems are stored in one or more files pertaining to a bass, a drum, a keyboard, another instrument, or some combination thereof;

processing the one or more files storing the one or more stems to extract dynamic features related to a behavior of an audio signal; and processing the one or more features related to the behavior to cause one or more graphical elements in the customized content item to move.

8. The computer-implemented method of claim 1, further comprising:

synchronizing text associated with the song file with audio associated with the song file at a character by character level, wherein each character of words is related to a precise timestamp in a song stored in the song file;

synchronizing text associated with the song file with audio associated with the song file at a word by word level, wherein each word of lyrics is related to a precise timestamp in the song; and synchronizing text associated with the song file with audio associated with the song file at a line by line level, wherein each line of the lyrics is related to a precise timestamp in the song.

9. The computer-implemented method of claim 1, wherein extracting, using the artificial intelligence engine comprising the one or more trained machine learning models, the one or more text features from the song file further comprises:

extracting, using a natural language processing technique, one or more keywords from each line of lyrics included in the song file;

determining, based on the one or more keywords, an overall meaning of a song stored in the song file; and generating, the customized content item based on the overall meaning.

10. The computer-implemented method of claim 1, further comprising:

predicting, using a mood classification model of the one or more trained machine learning models, one or more moods of a song stored in the song file; and generating the customized content item based on the one or more moods.

11. The computer-implemented method of claim 1, further comprising matching a song stored in the song file with a pre-built graphic template, wherein the matching is performed by using cosine-similarity between semantic embeddings retrieved from sentiment analysis performed on lyrics and content analysis performed on audio of the song file.

12. The computer-implemented method of claim 1, further comprising:

presenting a customization user interface on the user interface;

receiving one or more customizations to the customized content item; and rendering a subsequent customized content item that implements the one or more customizations, wherein the one or more customizations pertain to an aspect ratio, time-synchronization of lyrics, a background image, a video background, background treatment, font styling, font alignment, font size, font type, a visual effect based on music rhythm, graphical element placement, blurring, a color scheme, a start time to a song, an end time to a song, a song structure, or some combination thereof.

13. A system comprising:

a memory device storing instructions; and a processing device communicatively coupled to the memory device, wherein the processing device executes the instructions to:

receive a song file;

extract, using an artificial intelligence engine comprising one or more trained machine learning models, one or more audio features from the song file;

extract, using the artificial intelligence engine comprising the one or more trained machine learning models, one or more text features from the song file;

receive a selection of a pre-built template to use to generate a customized content item; and generate the customized content item based on the one or more audio features, the one or more text features, and the selection, wherein the customized content item is presented via a media player on a user interface.

14. The system of claim 13, wherein the processing device:

extracts at least two levels of the one or more audio features, wherein the at least two levels pertain to dynamic features suitable for dynamically configuring at least one aspect of rendering the customized content item and to static features that specify an identity of the customized content item.

15. The system of claim 13, wherein extracting the one or more text features from the song file further comprises:

obtaining a text file from the song file, wherein the text file comprises lyrics;

identifying one or more moods of the lyrics;

identifying one or more keywords included in the lyrics.

16. The system of claim 13, wherein the processing device:

presents, in a first portion of the user interface, a list of a plurality of pre-built templates;

receives the selection of the pre-built template from the list of the plurality of pre-built templates; and presents, in a second portion of the user interface, the customized content item in the media player.

17. The system of claim 13, further comprising downloading the customized content item to a computing device.

18. The system of claim 13, wherein extracting, using the artificial intelligence engine comprising the one or more trained machine learning models, the one or more audio features from the song file further comprises:

identifying one or more predominant instruments used at one or more sections of a song stored in the song file, wherein each of the one or more sections pertain to a structure of the song.

19. The system of claim 1, wherein extracting, using the artificial intelligence engine comprising the one or more trained machine learning models, the one or more audio features from the song file further comprises:

separating one or more stems using the song file, wherein the one or more stems are stored in one or more files pertaining to a bass, a drum, a keyboard, another instrument, or some combination thereof;

processing the one or more files storing the one or more stems to extract dynamic features related to a behavior of an audio signal; and processing the one or more features related to the behavior to cause one or more graphical elements in the customized content item to move.

20. A tangible, non-transitory computer readable medium storing instructions that, when executed, cause a processing device to:

receive a song file;

extract, using an artificial intelligence engine comprising one or more trained machine learning models, one or more audio features from the song file;

extract, using the artificial intelligence engine comprising the one or more trained machine learning models, one or more text features from the song file;

receive a selection of a pre-built template to use to generate a customized content item; and generate the customized content item based on the one or more audio features, the one or more text features, and the selection, wherein the customized content item is presented via a media player on a user interface.

* * * * *